UNITED STATES PATENT OFFICE.

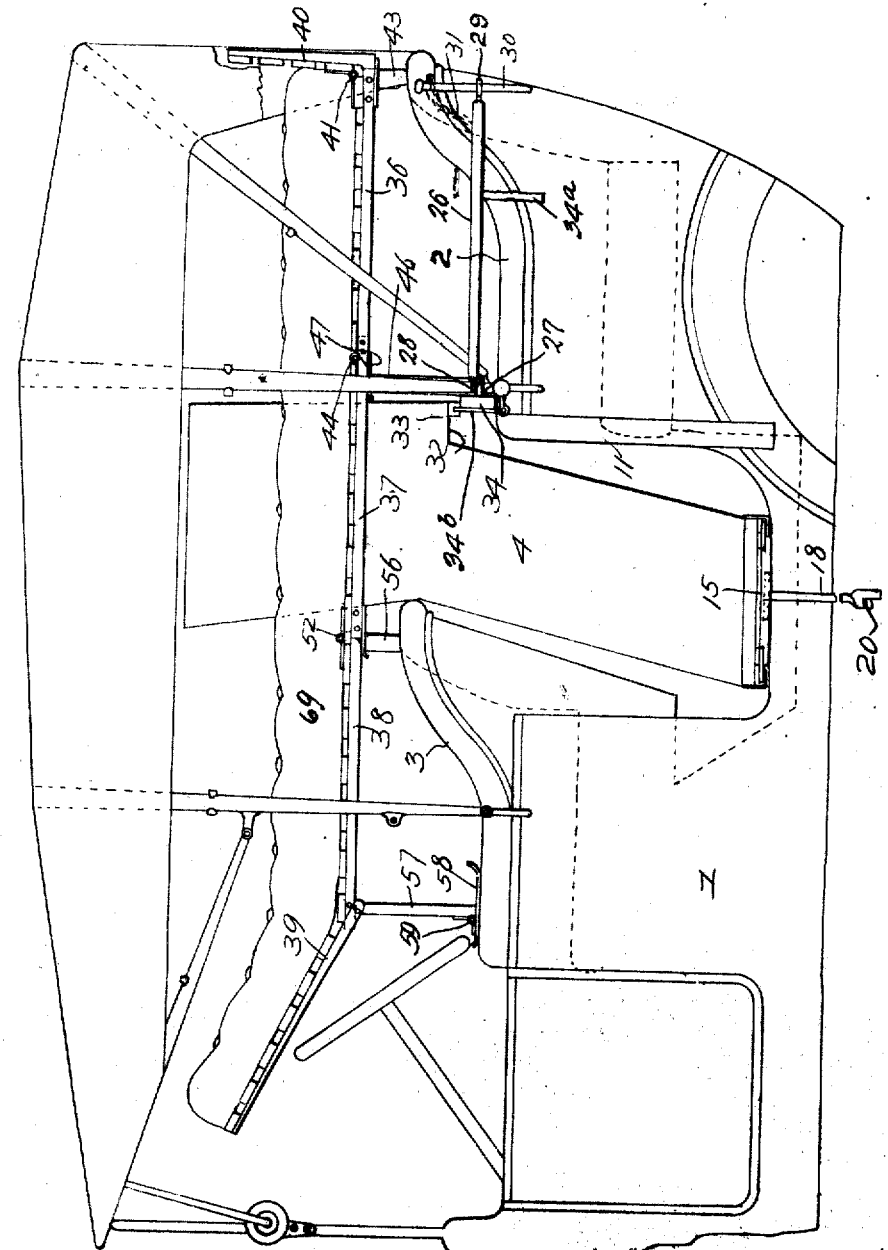

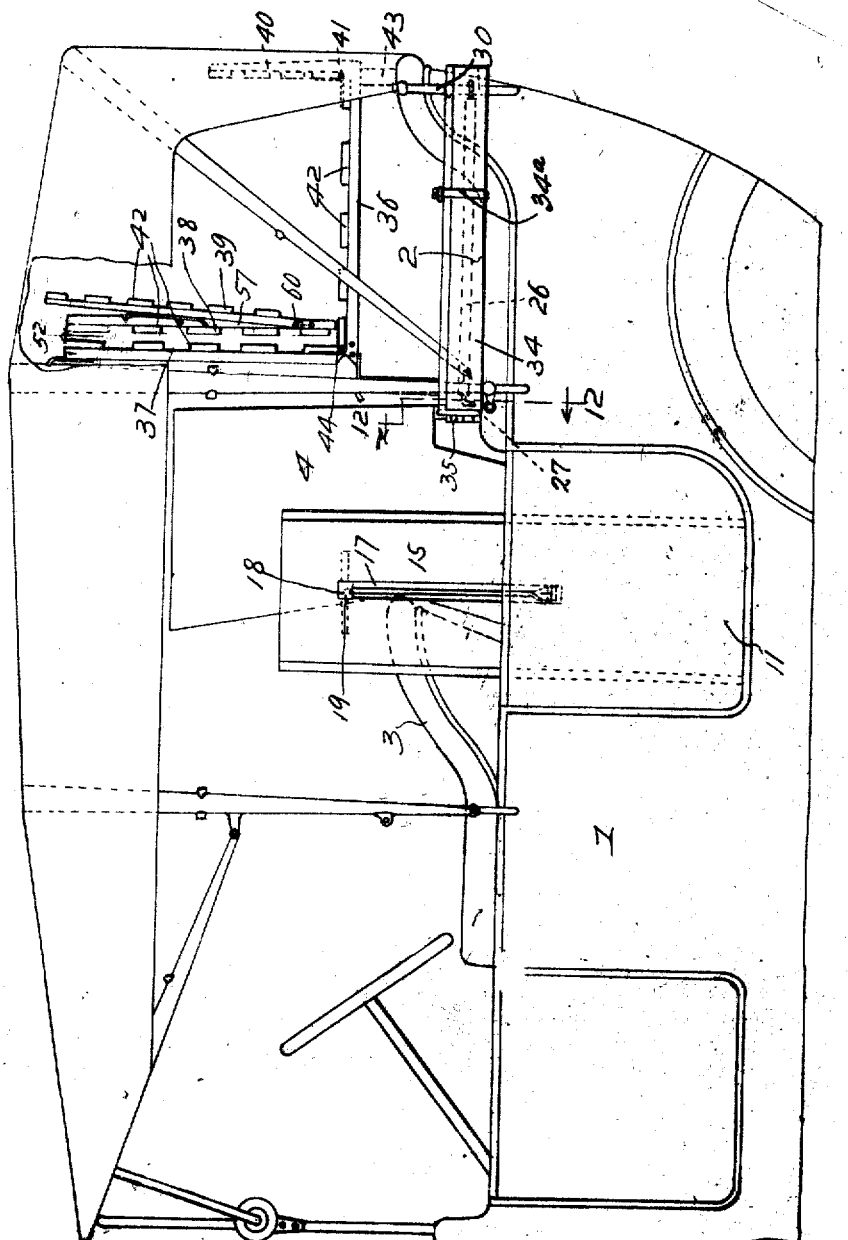

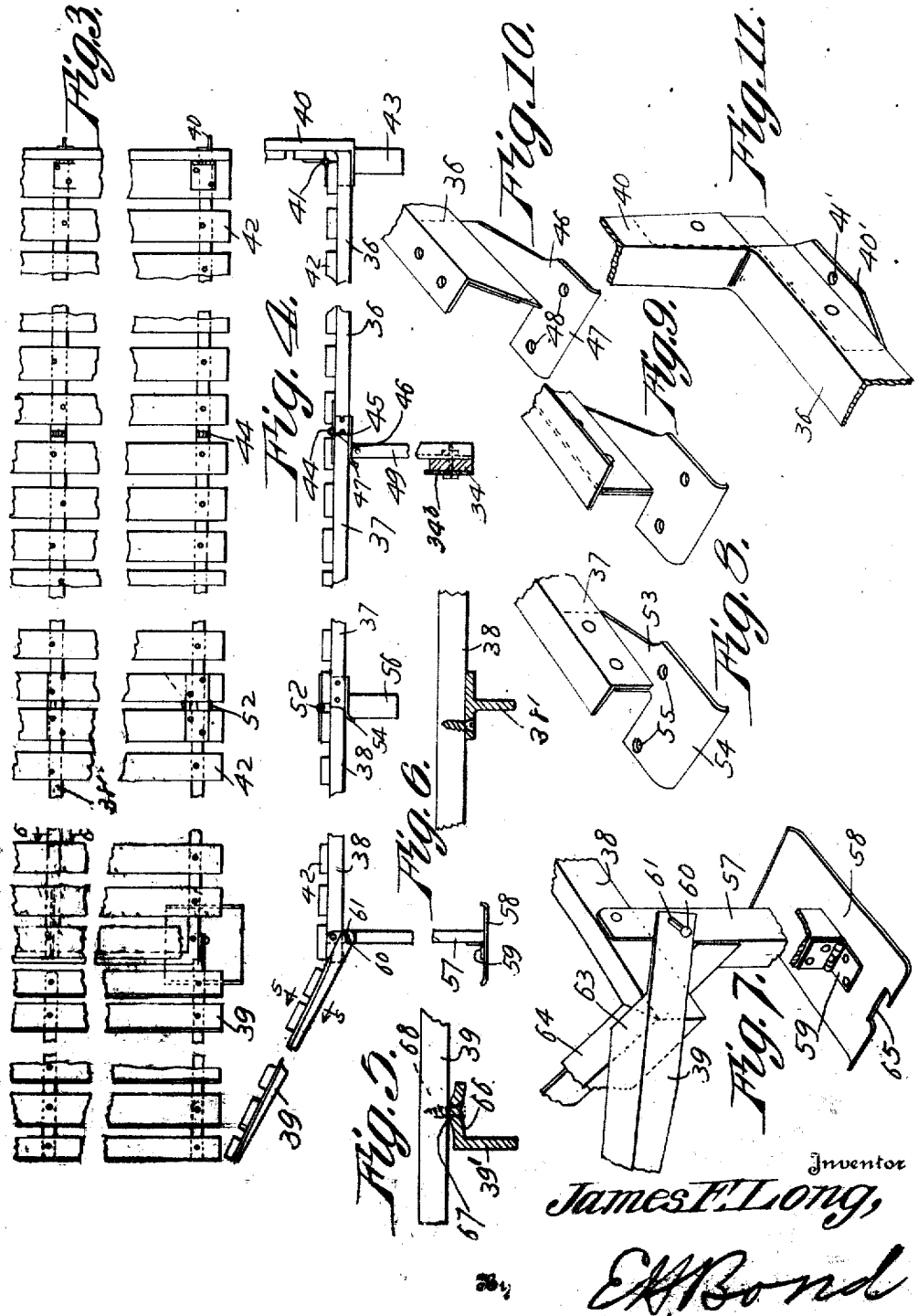

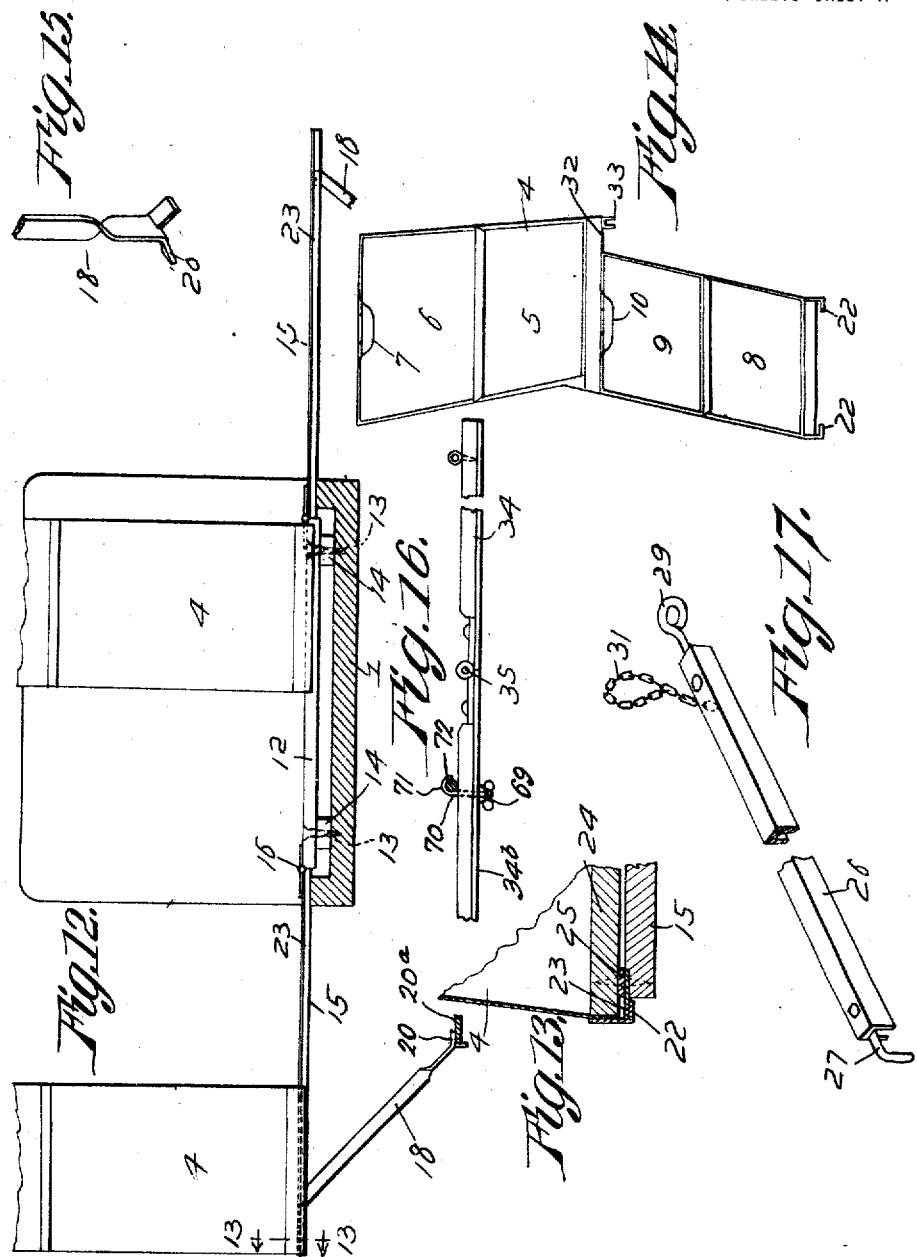

JAMES F. LONG, OF SAN FRANCISCO, CALIFORNIA.

CAMPING OUTFIT 1,240,353.

Specification of Letters Patent.

Patented Sept. 18, 1917.

Application filed May 26, 1916. Serial No. 100,052.

*To all whom it may concern:*

Be it known that I, JAMES F. LONG, a citizen of the United States, residing at San Francisco, in the county of San Francisco and State of California, have invented certain new and useful Improvements in Camping Outfits, of which the following is a specification.

This invention pertains to a camping outfit readily attachable to an automobile of almost any five or seven passenger type. It has for its objects among others to provide a simple, yet most efficient camping outfit comprising a plurality of sections detachably mounted and easily set up for use. It comprises a bed which may be made of any suitable material and which, by preference, is placed in position when the top is thrown back. The entire outfit can be placed in position upon the automobile inside of ten minutes by means of screws and is practical whether the doors open toward the front or back of the machine.

It has for a further object to provide an outfit of such a character that when on more extended trips a person can stop and arrange for cooking and sleeping in from three to five minutes. It also embodies cabinets which may be used as wardrobe, medicine chest, etc., for carrying a gasolene stove, cooking utensils, provisions, etc.

I aim also at improvements in the details of construction whereby I am enabled to provide a very strong and durable, yet light-weight outfit, the details of which will be varied according to the character of the automobile for which it is made.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation of the body of an automobile provided with my improvement, portions being broken away, and one of the cabinets removed and its support shown in its horizontal position.

Fig. 2 is a side elevation of the automobile body with the bed and the cabinets, etc., in folded position.

Fig. 3 is a top plan of the bed in its distended position, with portions broken away.

Fig. 4 is a side elevation of Fig. 3.

Fig. 5 is a cross section on the line 5—5 of Fig. 4, looking in the direction of the arrows.

Fig. 6 is a cross section on the line 6—6 of Fig. 3, looking in the direction of the arrows.

Fig. 7 is a perspective detail with portions broken away and a part in section, showing the support for the bed at the head and the foldable end section.

Fig. 8 is a perspective detail of a portion of the joint between sections of the bed.

Fig. 9 is a similar view showing a different form.

Fig. 10 is a similar view of substantially another form.

Fig. 11 is a perspective detail with portions broken away showing a corner member of the bed.

Fig. 12 is a vertical section on the line 12—12 of Fig. 2 with one of the cabinets moved out from its normal position.

Fig. 13 is an enlarged detail in section, taken on the line 13—13 of Fig. 12, looking in the direction of the arrows.

Fig. 14 is a diagrammatic view of one of the cabinets.

Fig. 15 is a perspective detail of the base portion of one of the supports for the lower guide for the cabinet.

Fig. 16 is a side elevation of two jointed members hereinafter more particularly referred to.

Fig. 17 is a perspective view broken away and partly in section, of a brace member seen in position in Fig. 1, for bracing the guide for a cabinet.

Like numerals of reference indicate like parts throughout the different views.

In the present instance I have shown an outfit as adapted for one type of automobile, but it is evident that the generic principle of the invention would not be departed from in varying the details of the construction to adapt it for use in connection with other types of machines. In the present instance I have chosen to show a bed which can be readily laid down by one person. When not in use, the mattress, the blankets, etc., may be rolled up against the back slats for traveling and by the provision of a hinged flap on the rear section of the bed I render it much easier to place pillows or anything desired on the back seat. Five or six inches more of space will be allowed if the cushion of the rear seat is removed or left at home. Either end of the bed may be used as the head. When the door space is narrower, the space above the arm rests is deeper and vice versa. When applied the bed will not injure the upholstery in any manner and the bed may be of any required size as to width or length according to requirements.

Referring to the drawings, 1 designates the body of an automobile, which, except as hereinafter described, may be of any well-known or approved type or form. 2 is the rear seat and 3 the front seat. The entire outfit is disposed between the back of the front seat and the rear end of the automobile, leaving the front seat for use as is common. Normally between the back and front seats are disposed cabinets 4, there being usually two, such as shown in Fig. 12 wherein one is shown in its normal position and the other distended or moved outward to make room for the bed. These cabinets are preferably made of metal, although not necessarily so, and are generally of the shape seen in Fig. 1, wherein is shown the cabinet upon the right hand side of the machine, the one upon the left having been removed for clearness of illustration. These cabinets may be in their interior construction as the dictates of the purchaser or user may require. In the present instance the upper portion comprises a bin 5 for containing flour or any other form of provision or substance and with a drawer or sliding compartment 6 at the top having a suitable handle 7 by which it may be withdrawn. The lower portion comprises a bin or the like 8 and a slidable drawer or portion 9 having a handle 10 for its manipulation. As the present invention does not pertain to the particular form of construction of the cabinet or its drawers, all of which may be of any well-known or approved form of construction, it is not deemed necessary to enter into the details thereof. Of course, the drawers should be made to slide upon suitable guides, and the cabinets may be provided with shelves or receptacles of any kind for different materials, such as it would be desired to take upon a trip in an automobile.

Normally the bins are disposed in the space between the front of the rear seat and the back of the front seat, as shown in Fig. 1, the lower portion of each bin being inclined forwardly, as illustrated in said figure. They are of such width as to be confined between the doors 11 when the latter are closed.

I wish it to be understood, however, that the invention is in no wise restricted to the interior construction or arrangement of these bins. The arrangement described may be reversed, that i the bin portion may be at the top of each compartment and the drawer or slide below or any other interior arrangement which may be found most expedient. I, therefore, have not gone into detail as to the construction of these elements of my outfit.

These bins when between the doors are supported upon a platform 12, as seen best in Fig. 12, which is secured to the floor of the car at such point by suitable means, as screws 13, cleats or the like 14 being preferably provided to bring the top of the platform 12 up to the proper height. When the outfit is to be used and the bed placed in position, these bins or receptacles 4 are designed to be moved outward, outside of the body of the car, as will be readily understood upon reference to Fig. 12, in which one of the bins, that to the left, is shown thus moved out, the other one, that on the right, being still in its position within the body of the car. In order to thus support the bins when moved outward, I provide a supporting member or platform 15 at each side, one for each bin 4 and each of these members is hinged, as at 16, to the adjacent end of the platform 12 within the car, and when not in use it is designed to be folded upward within the body of the car, as seen in Fig. 2, where it will be held from downward movement by the closed door or a suitable strap may be provided for securely holding it in closed position, although this latter is not necessary. This member 15 is provided longitudinally with a slot 17, as seen best in Fig. 2, within which folds a supporting member 18 hinged in any suitable manner, as at 19, within the said slot near the free end of the member 15 and its other end provided with the outturned feet or lateral portions 20, as seen best in Fig. 1 and also in dotted lines in Fig. 2, and which are adapted to rest upon the automobile step 20ª, as seen in Fig. 12, when the member 15 is in its horizontal position ready for the bin 4 to be moved outward thereon. When in its folded position, these feet 20 fit within a transverse slot in the member 15 at the inner end of the slot 17 therein, as shown clearly by dotted lines in Fig. 2. As the member 15 is lowered, this supporting member 18 automatically drops from its closed position to its diagonal position and thus stops the downward movement of the member 15 and supports it in its horizontal position, so that the bin may be moved outward thereon to provide room for the setting up of the bed. In order to guide the bin in its movement on the member 15, I provide the lower edge of the bin with inwardly extended guide members 22 which may be of any suitable nature and which are adapted to engage beneath the guiding strips 23 upon opposite sides of the member 15 at the top thereof, as seen in Fig. 13. The bottom 24 of the bin is provided with the reinforcing guide strips 25, as seen also in Fig. 13.

When the member 15 is thrown out into its horizontal supporting position, I preferably employ a brace 26, as seen in Fig. 1, which brace may be of the channel-iron form, seen in Fig. 17, if preferred, and is provided at one end with a hook member 27 adapted to engage in an opening 28 in a plate on the outer end of the guide member soon to be described and at its other end provided with a ring or the like 29 which is adapted to engage over a supporting member 30 on the rear of the car. If desired, a chain 31 may be provided, as seen in Figs. 1 and 17, secured to the brace and adapted to engage over said member 30 for better security, and to hold the brace in a horizontal position.

The bin is also adapted to be guided about midway its height, the said bin being provided at such point with an offset 32, as seen clearly in Figs. 1 and 14, and depending from the outer edge of this offset portion is a guide member 33, seen best in Fig. 14, adapted to be guided upon a guide member 34 having a rack 34ᵇ, and hinged as at 35, at a point just at the rear of the rear door, as seen in Figs. 1 and 2, and when not in use is adapted to be folded to the back along the side of the car, as seen in Fig. 2, where it also serves to prevent the member 15 from being moved on its hinge. When it is desired for use, it is swung outward into the position in which it is seen in Fig. 1, and the bin moved outward, being guided thereon, as well as guided at the bottom by the means hereinbefore described. When not in use it is turned at right angles to its operative position and extended rearward as in Fig. 2. It is to be understood that there is one of these members 34 at each side of the car and they may be affixed in position in any suitable manner.

When the party stops for the night or to camp out, the doors are opened, the members 15 and 34 are moved outward into their operative positions and the bins are slid out thereupon so as to give free access to the car, it being understood that the bed now to be described is normally folded up into position over the rear seat, as indicated in Fig. 2. When the bins are moved outward, it clears the space for the bed to be thrown down into position in which it is seen in Fig. 1. It will be understood that in Fig. 1 the bin nearest the observer is entirely removed in order to disclose other parts, its supporting member 15, however, being shown in proper position.

The bed is made in sections adapted to be folded up, as seen in Fig. 2, and readily distended, as seen in Fig. 1, when it is desired to use the same for sleeping purposes. In the present instance I have chosen to show it as composed of four sections 36, 37, 38 and 39 hingedly united together, and an upright section 40 to which the section 36 is hinged, as at 41, see Fig. 2. Each section comprises side rails and cross slats 42 which may be of any well-known or approved style. While this bed may be of any approved or suitable form of construction adapted to fold up in the manner shown, I illustrate herein a form which I find simple and efficient. The section 36 is provided at the rear end with supports 43 adapted to rest upon the rear of the rear seat, as seen in Figs. 1 and 2. The section 37 is hinged to the adjacent end of the section 36 by suitable hinges 44 and is adapted to fold upward, the abutting ends of the side strips of these two sections being beveled, as seen at 45 in Fig. 4, and secured to the under side of the section 36 at its end adjacent the hinge and overlapping the joint between said sections is a plate 46 having a forwardly extended and slightly downwardly curved end member 47 having holes 48 for the reception of screws or other means which serve as an attachment for the depending support 49 which is pivotally mounted at its upper end, as seen in Fig. 4, so as to fold horizontally or to swing down into a vertical position, as seen in Fig. 4, similarly to the depending member 56 seen in Fig. 1.

The section 38 is hinged to the section 37, as at 52, and to the under side of the end of the section 37 is a plate 53 having the forward extension 54, the front end of which is curved downwardly, as shown clearly in Fig. 8, and having holes 55 for the attachment of a depending supporting member 56 adapted to rest upon the rear of the front seat, as seen in Fig. 1.

The side rails of the bed sections may be formed in any suitable manner. In Fig. 8 I have shown the same as of one form; in Fig. 9 as of another form and in Fig. 10 as of another form, and while these have been found to be very efficient for the purpose for which they are designed, it is evident that the generic feature of the invention is in no wise restricted to any one of these particular forms of the side rails and the latter, therefore, may be varied without departing from the spirit of the invention or sacrificing any of its advantages.

The forward end of the section 38 has depending therefrom the supporting leg or member 57 which, at its lower end, carries a shoe 58 hinged thereto, as at 59, so as to fold up thereagainst when desired, and to this member 57 there is foldably attached the side rails of the member 39. This connection in the present instance is shown as formed by a pin 60 held in the member 57 and passed through an elongated slot 61 in the end of the side rail of the section 39, as seen best in Fig. 7. When the section 39 is extended in the position in which it is seen in Fig. 4, an inwardly extending flange 63 on the side rail thereof rests upon the horizontal flange 64 on the adjacent end of the section 38, all as clearly shown in Fig. 7. When the parts are to be folded, this member is moved so that the flange 63 clears the flange 64, which is provided for by the movement of the member 39 by reason of the elongated slot 61 and when the section 39 is folded the side rails thereof are received within slots 65 in the outer end of the shoe 58, thus allowing the parts to fold into compact relation.

The slats may be affixed to the side rails and a center rail in any suitable manner. In Fig. 5 I have shown the center rail 39' as having a lateral member 66, the upper face of which is rounded, as at 67, and through which passes a screw or the like 68 which serves to hold the slat in position and still allow a little rocking movement thereof.

As seen in Fig. 11, the side rail 36 is provided with a laterally extending flange or member 40' having an opening 41' through which may pass the screw or other means for securing the support 43 in position.

The slats may be supported intermediate the side rails in any suitable manner, as, for instance, by a central longitudinal member, as 38', see Figs. 3 and 6.

The upper guide 34 for the upper portion of the bin may be affixed in any suitable manner. As shown, the rack 34ᵇ, the bed and the guide 34 are fastened permanently together, and are placed on and taken off the automobile as a unit by means of a thumb nut 69 on a bolt 70 having a hooked end 71 to engage over a member 72 on the automobile. Removal of the screw permits of removal of the member 34, when it is desired to restore the automobile to its original condition. It is to be understood that all of the parts, except the bed, are duplicated and being the same upon both sides of the machine it has not been considered necessary to show but the one side.

From the foregoing description, the construction and mode of operation will be clearly understood and a further detailed description thereof does not seem necessary, except to state that while traveling the bins 4 are in their innermost position in the space between the rear and front seats and transversely between the doors and the bed is folded up into the position in which it is seen in Fig. 2, and all the bedding, such as mattress, pillows, blankets, etc., placed on the rear section 36 of the bed where they are out of the way and held against displacement by the folded sections of the bed. When arriving at the camp, the doors of the automobile are opened, the bin-supporting members 15 are lowered upon their hinges into a horizontal position, when the supporting members 18 drop into a vertical position to support the outer ends of the said members, the bins being thus readily accessible to remove therefrom the provisions, the gasolene stove or any other articles that may have been stored therein, and when night comes a single person can easily throw the bed down from its folded condition in Fig. 2 to its out-stretched condition in Fig. 1, the head section 39 moved into its inclined position and the mattress 69 placed thereon and the bed is ready for use. The various parts are easily handled and can be quickly moved from the one position to the other and the whole constitutes a very efficient, comfortable, complete camping outfit which when not desired for use on the automobile can be quickly removed by removal of the two screws 13 and two thumb nuts 69 and stored away until another trip is to be taken.

Modifications in details may be resorted to without departing from the spirit of the invention or sacrificing any of its advantages.

When the brace member 26 and the guide member 34 are not in use, they are folded back and lie parallel against each other, as seen in Fig. 2, and a strap and buckle 34ᵃ permanently attached to either of the members 26 or 34 is buckled around both, holding them securely in position when driving along.

What is claimed as new is:—

1. A removable camping outfit for motor vehicles comprising a foldable bed extensible lengthwise and within the vehicle and adapted to be supported upon the seats thereof, and bins disposed between the seats, and foldable means for supporting said bins both within and without the body of the vehicle, a guide for said bins and means securing said bed and guide together.

2. A removable camping outfit for motor vehicles comprising a foldable bed extensible lengthwise and within the vehicle and adapted to be supported upon the seats thereof, and bins disposed between the seats, and foldable means for supporting said bins both within and without the body of the vehicle, and means on which said bins are adapted to slide outward from the vehicle and means for securing said bed and slide together.

3. A portable camping outfit for motor vehicles comprising a bed in foldable sections and extensible lengthwise of and within the vehicle, means for supporting said bed in its distended position and movably mounted receptacles adapted to occupy the space between the seats when the bed is in its folded condition, a guide for said receptacles and means for securing the guide and bed together.

4. A portable camping outfit for motor vehicles comprising a bed in foldable sections and extensible lengthwise of and within the vehicle, means for supporting said bed in its distended position and movably mounted receptacles adapted to occupy the space between the seats when the bed is in its folded condition, a guide for said receptacles, means for securing the guide and bed together and means for supporting said receptacles when they are moved laterally outward from the vehicle.

5. In a camping outfit for motor vehicles, a foldable bed extensible within and lengthwise of the vehicle, means for supporting receptacles between the seats, a guide for said receptacles, means for securing the guide and bed together, and hinged means adapted to be dropped to a horizontal position and extend outward from the vehicle to support said receptacles when they are moved from their normal position between the seats.

6. In a camping outfit for motor vehicles, a foldable bed extensible within and lengthwise of the vehicle, means for supporting receptacles between the seats, a guide for said receptacles, means for securing the guide and bed together, hinged means adapted to be dropped to a horizontal position and extend outward from the vehicle to support said receptacles when they are moved from their normal position between the seats, and coöperating guiding means between said receptacles and the hinged supporting means.

7. In a camping outfit for motor vehicles, a foldable bed extensible within and lengthwise of the vehicle, means for supporting receptacles between the seats, a guide for said receptacles, means for securing the guide and bed together, hinged means adapted to be dropped to a horizontal position and extend outward from the vehicle to support said receptacles when they are moved from their normal position between the seats, coöperating guiding means between said receptacles and the hinged supporting means, and an inclined brace engageable at one end with said hinged means when in horizontal position.

8. In a portable camping outfit for motor vehicles, a foldable bed extensible within and lengthwise of the vehicle, movably mounted receptacles adapted to occupy the space between the seats, a guide for said receptacles, means for securing the guide and bed together and hinged means extensible laterally of the vehicle and upon which said receptacles are adapted to slide outward.

9. In a portable camping outfit for motor vehicles, a foldable bed extensible within and lengthwise of the vehicle, movably mounted receptacles adapted to occupy the space between the seats, a guide for said receptacles, means for securing the guide and bed together, hinged means upon which said receptacles are adapted to slide outward, and pivotally mounted supports for said means.

10. In a portable camping outfit for motor vehicles, a foldable bed extensible within and lengthwise of the vehicle, movably mounted receptacles adapted to occupy the space between the seats, a guide for said receptacles, means for securing the guide and bed together, hinged means upon which said receptacles are adapted to slide outward, pivotally mounted supports for said means, and said means having longitudinal slots into which said supports are adapted to fold.

11. In a portable camping outfit for motor vehicles, a foldable bed extensible within and lengthwise of the vehicle, movably mounted receptacles adapted to occupy the space between the seats, a guide for said receptacles, means for securing the guide and bed together, hinged means upon which said receptacles are adapted to slide outward, and pivotally mounted supports for said means, said means having longitudinal slots into which said supports are adapted to fold, said supports having out-turned members and said means having a lateral slot into which outturned members extend when the supports are folded.

12. In a portable camping outfit for motor vehicles, a bed in foldable sections extensible within and lengthwise of the vehicle, dependent means carried by the several sections for supporting the bed upon the seats of the vehicle, a pivotally mounted section at one end, with means for holding it in an inclined position, and a depending support for said end section and the adjoining section, said support being provided with a pivotally mounted shoe and said shoe having a notch into which the side rail of said end section is received when the bed is folded, the side rails of said end section having elongated pin and slot engagement with said support, said end section having a flange extending inwardly, and the adjacent section having a horizontal flange on which the first-named flange rests when the end section is extended.

In testimony whereof I affix my signature in the presence of two witnesses.

JAMES F. LONG.

Witnesses:
 CARL KLUTE,
 RICHARD LONG